United States Patent
Sawyer et al.

(10) Patent No.: US 10,842,175 B2
(45) Date of Patent: Nov. 24, 2020

(54) CONTROL OF PATHOGENIC BACTERIA IN FOODS

(71) Applicant: NEVADA NATURALS INC., Albuquerque, NM (US)

(72) Inventors: Anthony J. Sawyer, Albuquerque, NM (US); Richard F. Stockel, Bridgewater, NJ (US)

(73) Assignee: NEVADA NATURALS INC., Albuquerque, NM (US)

( * ) Notice: Subject to any disclaimer, the term of this patent is extended or adjusted under 35 U.S.C. 154(b) by 0 days.

(21) Appl. No.: 16/818,027

(22) Filed: Mar. 13, 2020

(65) Prior Publication Data

US 2020/0214320 A1 Jul. 9, 2020

Related U.S. Application Data

(62) Division of application No. 16/265,515, filed on Feb. 1, 2019, now Pat. No. 10,624,368.

(60) Provisional application No. 62/625,139, filed on Feb. 1, 2018.

(51) Int. Cl.

| A23K 30/00 | (2016.01) |
|---|---|
| A23L 3/3562 | (2006.01) |
| A23K 40/30 | (2016.01) |
| A23B 4/20 | (2006.01) |
| A23K 20/163 | (2016.01) |
| A23K 50/42 | (2016.01) |
| A23L 3/3526 | (2006.01) |
| A23K 20/142 | (2016.01) |
| A23L 3/3517 | (2006.01) |
| A23K 20/158 | (2016.01) |

(52) U.S. Cl.
CPC ............... *A23K 30/00* (2016.05); *A23B 4/20* (2013.01); *A23K 20/142* (2016.05); *A23K 20/158* (2016.05); *A23K 20/163* (2016.05); *A23K 40/30* (2016.05); *A23K 50/42* (2016.05); *A23L 3/3517* (2013.01); *A23L 3/3526* (2013.01); *A23L 3/3562* (2013.01); *A23V 2002/00* (2013.01)

(58) Field of Classification Search
CPC .... A23K 30/00; A23K 20/142; A23K 20/158; A23K 20/163; A23K 40/30; A23K 50/42; A23B 4/20; A23L 3/3517; A23L 3/3526; A23L 3/3582; A23V 2002/00
See application file for complete search history.

(56) References Cited

U.S. PATENT DOCUMENTS

| 4,002,775 | A | 1/1977 | Kabara |
|---|---|---|---|
| 4,997,851 | A | 3/1991 | Isaacs et al. |
| 5,434,182 | A | 7/1995 | Isaacs et al. |
| 6,414,023 | B1 | 7/2002 | Brandsborg et al. |
| 7,407,679 | B2 | 8/2008 | Beltran et al. |
| 8,193,244 | B1 | 6/2012 | Stockel et al. |
| 8,734,879 | B2 | 5/2014 | Sawyer et al. |
| 8,834,857 | B1 | 9/2014 | Winston et al. |
| 8,926,997 | B1 | 1/2015 | Stockel et al. |
| 9,023,891 | B2 | 5/2015 | Stockel et al. |
| 9,271,495 | B2 | 3/2016 | Sawyer et al. |
| 10,188,121 | B2 | 1/2019 | Burnett et al. |
| 2003/0152676 | A1 | 8/2003 | Yajima et al. |
| 2010/0092420 | A1 | 4/2010 | Miret Carceller et al. |
| 2010/0303966 | A1 | 12/2010 | Sunvold et al. |
| 2011/0177229 | A1 | 7/2011 | Bakal et al. |
| 2016/0095313 | A1 | 4/2016 | Wang et al. |
| 2017/0295829 | A1 | 10/2017 | Saurabh et al. |
| 2018/0310566 | A1 | 11/2018 | Sawyer et al. |

FOREIGN PATENT DOCUMENTS

WO 2016024999 A1 2/2016

OTHER PUBLICATIONS

Pohlman, F. et al., "Reduction of E. coli, Salmonella typhimurium, coliforms, aerobic bacteria, and improvement of ground beef color using trisodium phosphate or cetylpyridinium chloride before grinding", Meat Sci. Apr. 2002; 60(4):349-56.

Chen, X. et al., "Efficacy of various antimicrobials on reduction of Salmonella and campylobacter and quality attributes of ground chicken obtained from poultry parts treated in a postchill decontamination tank", J Food Prot. Nov. 2014; 77(11):1882-8.

Sharma, C. et al., "Evaluation of antimicrobial effects of lauric arginate on reduction of Salmonella spp. in ground chicken", International Journal of Food Science & Technology , vol. 48, Issue 7, Mar. 13, 2013NPR on Dec. 5, 2018, "More Raw Beef Recalled After Nationwide Salmonella Outbreak".

(Continued)

*Primary Examiner* — C. Sayala

(74) *Attorney, Agent, or Firm* — Benesch, Friedlander, Coplan & Aronoff LLP

(57) ABSTRACT

Methods of making coated pet food kibble and the kibble product by coating kibble with a composition that include at least one of: (i) lecithin and chicken fat; (ii) lecithin, a glycerol monoester of a fatty acid, a sugar monoester of a fatty acid, and chicken fat; (iii) lecithin, $N^\alpha$—($C_8$-$C_{18}$) acyl arginine alkyl ($C_1$-$C_8$) ester, and chicken fat; or (iv) $N^\alpha$—($C_8$-$C_{18}$) acyl arginine alkyl ($C_1$-$C_8$) ester-thymol and chicken fat. When the pet food kibble coated with a composition as described above, exhibits amounts of *Salmonella* sp. that are reduced by about 99%. This reduction is effective for at least 60 days post coating when compared to pet food kibble coated with a composition lacking one of (i)-(iv). The compositions are also used in a method for treating raw beef or poultry prior to grinding where the ground meat exhibits amounts of *Salmonella* sp. that are reduced by about 99%.

17 Claims, No Drawings

(56) References Cited

OTHER PUBLICATIONS

Philpott, T., "There Is Poop in Basically All Hamburger Meat", Mother Jones, Aug. 24, 2015, https://www.motherjones.com/food/2015/08/poop-ground-beef-superbugs-antibiotic-resistant/; last accessed Feb. 5, 2019.

Flynn, D., "Treating virulent strain of Salmonella as adulterant in largest beef recall in history", https://www.foodsafetynews.com/2018/10/treating-virulent-strain-of-salmonella-as-adulterant-in-largest-beef-recall-in-history/; last accessed Feb. 5, 2019.

Robinson, S., "Salmonella Could Be Beef Industry's New Biggest Challenge", Food Safety News; https://www.foodsafetynews.com/2013/08/salmonella-could-be-the-beef-industrys-new-biggest-challenge/; last accessed Feb. 5, 2019.

Sohaib, M. et al., "Postharvest intervention technologies for safety enhancement of meat and meat-based products; a critical review", J Food Sci Technol. Jan. 2016; 53(1): 19-30.

Moore, A. et al., "Evaluation of USDA approved antimicrobials on the reduction of Salmonella and Campylobacter in ground chicken frames and their effect on meat quality", Poultry Science, vol. 96, Issue 7, Jul. 1, 2017, pp. 2385-2392.

D. Samal. et al., "Food Preservatives and Their Uses: A Short Report", Asian Journal of Biology, 4(1): 1-4, 2017; Article No. AJOB.36091,ISSN: 2456-7124.

M. Fornier, "Impact of Kibble Formulation on Palatability", www.petfoodindustry.com.

Li, X. et al, (2012). Surveillance of Salmonella prevalence in animal feeds and characterization of the Salmonella isolates by serotyping and antimicrobial susceptibility. Foodborne Pathogens and Disease, 9, 692-698. https://doi.org/10.1089/fpd.2011.1083.

"Multistate Outbreak of Salmonella Schwarzengrund Infections Linked to Dry Pet Food (Final Update)" Centers for Disease Control and Prevention; Posted Sep. 4, 2007.

Behravesh, CB et al., "Human Salmonella infections linked to contaminated dry dog and cat food, 2006-2008", Pediatrics. Sep. 2010;126(3):477-83.

Maciorowski, K. et al., "Incidence, sources, and control of foodborne Salmonella spp. in poultry feeds", World's Poultry Science Journal, vol. 60, Issue 4 , Dec. 2004 , pp. 446-457.

Britton, B., "Effects of Antimicrobial Intervention on Food Safety and an Assessment of the Colorado Pork Supply", Colorado State University, Summer 2018.

In. Hoover, D. et al., "Sensitivity of Spores to Hydrostatic Pressure: Mechanisms of Inactivation, Injury and Repair, Phase II", Technical Report Natick/TR-031018, U.S. Army Soldier and Biological Chemical Command, Soldier Systems Center, Natick, Massachusetts, Mar. 2003 (Sep. 1995-Jun. 1999).

Mansour E. et al, "Comparison of the effect of monolaurin on the growth and survival of Enterococcus and Salmonella", USDA Agricultural Research Service Publication #233708.

Buket E. et al, "Antimicrobial and antibiofilm effects of selected food preservatives against Salmonellaspp. isolated from chicken samples", Poultry Science, vol. 93, Issue 3, Mar. 1, 2014, pp. 695-701, httpsdoi.org10.3382ps.2013-03404 Published Feb. 25, 2014Oxford University Press.

Ma, Qiumin, "Improving antimicrobial activity of lauric arginate by combination with essential oils for novel applications." PhD diss.,University of Tennessee, 2015.https://trace.tennessee.edu/utk_graddiss/3440.

Microbiological safety of raw minced beef and beef burgers on retail sale in Ireland, Apr. 2013, publication of Food Safety Authority of Ireland.

Zhang et al.. 2017. Critical concentration of lecithin enhances the antimicrobial activity of eugenol against Escherichia coli. Appl Environ Microbiol 83:e03467-16. https://doi.org/10.1128/AEM.03467-16.

Chen, J.H et al. 2012. Intervention Technologies for Ensuring Microbiological Safety of Meat: Current and Future Trends. Inst of Food Technologists. doi: 10.1111/j.1541-4337.2011.00177.x.

Maji, S. et al 2018. Synthetic food preservatives and their impacts on human health. IJGHC, Jun. 2018-Aug. 2018; Sec. A; vol. 7, No. 3, 629-639. DOI: 10.24214/IJGHC/GC/7/3/62939.

Z.I.M Shaeif et al. 2017. Review on methods for preservation and natural preservatives for extending the food longevity. Chemical Engineering Research Bulletin 19(2017) 145-153.ISSN: 2072-9510.

Non-Final Office Action issued in U.S. Appl. No. 16/265,515 dated Aug. 8, 2019.

Final Office Action issued in U.S. Appl. No. 16/265,515 dated Jan. 14, 2020.

Notice of Allowance issued in U.S. Appl. No. 16/265,515 dated Feb. 18, 2020.

"Lecithin Overview", downloaded from http.://assets.adm.com/Products-And-Services/Food-Ingredients/Lecithin/Lecithin-Overview.pdf, 8 pages, downloaded on Feb. 10, 2020. (Year 2020).

International Search Report and Written Opinion issued in PCT application No. PCT/US2020/016153 dated May 26, 2020.

CONTROL OF PATHOGENIC BACTERIA IN FOODS

PRIORITY

This application claims priority to U.S. application Ser. No. 16/265,515, filed Feb. 1, 2019, now U.S. Pat. No. 10,624,368, which claims priority to U.S. Provisional Pat. App. No. 62/625,139, filed on Feb. 1, 2018, which is incorporated by reference herein in its entirety.

TECHNICAL FIELD

The purpose of this invention is to present a composition for a treatment system for human foods and pet foods. Compositions can be specially designed to bring preservatives or other ingredients that have inhibitory characteristics in contact with bacteria.

BACKGROUND

It is well known that there have been serious bacterial contamination issues in the recent past in both human food and companion pet food. It would be desirable to prevent bacterial contamination in the fatty sections of dry pet foods and fatty human food. *Salmonella* bacteria live in the intestines, both human and animal, and meat may become contaminated if animal feces spreads during the butchering process. Seafood, fruits and vegetables can also become tainted by contaminated water. It is well known that there have been serious bacterial contamination issues in the recent past in both human food and companion pet food. However, there are no published methods found to reach commonly found bacteria, e.g. *Salmonella*, etc. in the fat portions of foods utilizing commonly used preservatives.

One reason is that consumers are aware of non-green and natural additives in food, and since the invention of the internet, more people are educated about chemicals used to process their foods that might be retained.

In Pohlman, F. et al., Meat Sci. 2002 April; 60(4):349-56, 0.5% cetylpyridinium chloride (CPC) was applied to beef trimmings either aerobically or under vacuum before grinding. Beef trimmings were inoculated with *Salmonella typhimurium* then treated with CPC in vacuum or aerobic conditions.

In Chen, X. et al., J Food Prot. 2014 November; 77(11): 1882-8, ground chicken was reported to likely have higher microbiological loads than whole carcasses and parts. Five treatments (0.003% chlorine, 0.07 and 0.1% peracetic acid [PAA], and 0.35 and 0.6% cetylpyridinium chloride [CPC]) were evaluated. Results from this study indicated that using PAA as an antimicrobial agent in a postchill decontamination tank to treat ground poultry parts is effective for the reduction of *Salmonella*.

In Sharma, C. et al., the authors report the efficacy of lauric arginate (LAE) on *Salmonella* survivability in ground chicken containing 9.8% fat was determined under refrigerated storage and concluded that, although LAE possesses strong inhibitory ($P<0.05$) effect against *Salmonella* in suspension in 0.1% peptone water, no inhibitory ($P>0.05$) effect on growth of *Salmonella* was observed in ground chicken at the currently approved levels of 200 ppm.

Kibble and Pet Food

Pet food is a specialty food for domesticated animals that is formulated according to their nutritional needs. Some type of extrusion is commonly used. It generally consists of meat, meat byproducts, cereals, greens, vitamins, and minerals. Biscuit type pieces are called "kibble". To meet nutritional requirements, pet food manufacturers blend animal fats, e.g. chicken fat, etc., and meals with soy and wheat grains and vitamins and minerals. This yields a cheap, nutritious pellet that no one wants to eat.

The primary ingredients in pet food are byproducts of meat, poultry, and seafood, food feed grains, and soybean meal. Other ingredients may include salt, preservatives, stabilizers, and chilling agents. Kibble generally contains about 10% moisture. The following is the current general method of manufacturing dry pet food (kibble): dry meal is heated with steam, and moisture is added to approximately 25 wt % level; the wet meal is extruded under pressure and cut to size; the kibble is conveyed with air on to a dryer bed at approximately <220° F.; the kibble are dried down to a moisture level of 6 to 8 wt %; the kibble are sifted to remove broken and fines. Also, the kibble may be sprayed sometimes with another wet coating, usually a liquid flavor ("palatant") that is water-based. It is during drying and sifting steps that contamination where microbes like *Salmonella* strains can be introduced, and this presents a serious problem. Anytime you introduce water/moisture, the probability of introducing pathogens is a concern. The instant invention solves the preservative problem without changing the process with adverse economic effects. The grains, meat, poultry parts, etc. are heated to 250-260 degrees ° F. This step is designed to kill all the pathogens that likely arise from the poultry scraps that can contain *Salmonella*. However, many manufacturers do not have good temperature control. Also, cross-contamination can occur once the kibble is placed into storage bins and dryers. The moisture level out of the extruder can be 20-25 wt %. After the drying step, the moisture level can be 8-10 wt %. The extruder is intended to be the kill step, however because of the moisture level there can be growth from cross contamination in the manufacturing facility. The normal manufacturing procedure is to coat the extruded kibble with fat and then a flavor coating (called a palatant) can be added by spraying. Poultry fat is commonly used as a coating for kibble.

Shelf life of kibble is usually 1 to 1½ years, however the shelf life of the palatant can be much shorter, e.g. possibly three months. If the kibble factory is contaminated with *Salmonella*, the bacteria can fall into the production lines and get packaged into the kibble bags. Dogs are relatively resistant to *Salmonella* and usually do not show signs of illness from eating contaminated kibble. But humans who handle the food or the dog can acquire the bacteria and get sick. This makes dry dog food a potentially hazardous product, one best kept away from people with weak immune systems such as young children and the elderly.

Present kibble products are commonly preserved with potassium benzoate, sorbate or similar. These are water soluble and do not have the ability to penetrate fat and reach any bacteria hiding inside.

Human infections of *Salmonella* have been traced back to contaminated feed. From the CDC website, "Multistate Outbreak of *Salmonella* Schwarzengrund Infections Linked to Dry Pet Food (FINAL UPDATE)" Posted Sep. 4, 2007, the CDC is collaborating with public health officials in Pennsylvania and other state health departments and the US FDA to investigate a multistate outbreak of *Salmonella* serotype Schwarzengrund infections in humans.

In. Maciorowski, K. et al., World's Poultry Science Journal, Volume 60, Issue 4, December 2004, pp. 446-457, the authors report that transmission of food-poisoning salmonellae in the poultry industry is often associated with a contaminated feed supply.

SUMMARY

This invention discloses the use of emulsifying agents and surfactants with or without preservatives to penetrate fat in both human and animal foods and to control the growth of *Salmonella* and other pathogens therein. These emulsifying agents/surfactants include sucrose monoesters of fatty acids, glycerol monoesters of fatty acids, and lecithin, for example.

The instant invention demonstrates compositions that can penetrate fat that is used to coat pet food, e.g. dry kibble, etc., and reach pathogen within the coating of a kibble. The instant invention discloses a method to penetrate the fat coating on kibble to reach the *Salmonella* that is not adequately killed in the manufacturing process for kibble.

The compositions of the invention can also penetrate fat of products such as ground beef, or ground poultry. The instant invention discloses the use of emulsifying agents with or without other preservatives, such as, benzoates sorbates, nitrates, sulfites, lauric arginate, to penetrate fat in both human and animal foods and to control the growth of *Salmonella* and other pathogens. These emulsifying agents include 1) sucrose monoesters of fatty acids; 2) glycerol monoesters of fatty acids; and 3) lecithin.

The method in the instant invention of treating human food, such as ground beef or ground turkey, would entail coating the scraps of beef and turkey prior to a grinding step with the compositions of the instant invention, similar to how dry kibble is coated. This will assure that the distribution of the compositions is evenly distributed in the ground product but also be more effective than post adding the compositions after the grinding process because of the difficulty of reaching and evenly distributing the composition of the instant invention by post adding into the ground meat product.

DETAILED DESCRIPTION

The inventors have several patents and patent applications that disclose green and natural GRAS food preservatives, lauric arginate (LAE), as well as synergies of LAE with emulsifiers, e.g. glycerol monoesters, including U.S. Pat. Nos. 8,734,879; 9,271,495; 8,834,857, 8,926,997, PCT/US2014/051293, WO 2016/024999 the contents of which are all incorporated by reference in their entirety.

The purpose of this invention is to present a composition for treatment of foods, e.g. human foods such as ground beef or ground turkey and pet foods such as kibble. The compositions are specially balanced to bring preservatives or other ingredients that have inhibitory characteristics in contact with bacteria. This system can be adjusted to maximize effectiveness depending on where and on what the preservatives or other ingredients that have inhibitory characteristics are to be used.

For purposes of this invention, it is assumed that ground beef or poultry for human consumption are usually chilled and have several months shelf life. For dry pet food/kibble, the average shelf life is 1 year, and that it takes about 30 to 60 days from the time of manufacturing until the pet food reaches the consumer. In order to screen the final product for contamination, a major pet food testing lab specifies only 0, 20, and 60 day recoveries.

Advantages for dry pet food/kibble include but are not limited to: additives that are nutritious; additives that are GRAS; process cost that are minimized; additives that are inexpensive; additives are commercially available in large volumes from multiple sources; a process that is simple and does not require any additional expense of equipment; no need for additional energy costs.

Compositions of this invention comprise 1) one or more antimicrobial or one or more surfactants/emulsifiers with preservative characteristics, 2) one or more surfactants with an average HLB between 7 and 12 value to enable the preservative/antimicrobial agent to reach the bacteria on or within the food, 3) an aqueous vehicle to deliver the system ingredients, 4) optionally buffers to maintain a pH between about 2.0 to 7.0, 5) optionally a chelating agent, and 6) optionally enhancers/synergists to the preservative system.

As noted above, a particularly serious problem to be dealt with in preserving foods is due to the penetration of fats and oils with pathogenic bacteria, such as *Salmonella*. In many cases bacteria trapped in fats and oils cannot be reached using preservatives alone. Furthermore, even if an antimicrobial can reach the target bacteria, kill is not generally achieved in the absence of any water because the bacteria often become dormant and cannot metabolize the antimicrobial making it ineffective.

Accordingly, the surfactants in the compositions of this invention enhance the interaction of the composition with the bacteria by ensuring contact and by introducing moisture to activate the anti-microbials. In order to decontaminate oils and fats on or within foods, this invention employs surfactants to emulsify small amounts of aqueous preservative and moisture into the fats and oils present in the food.

Surfactants optimize the HLB to help the aqueous system containing the preservative, to either more effectively wet food surfaces or to penetrate into the oils and fats. Wetting of surfaces is best achieved with surfactants.

Fats and oils in foods can be generally best be emulsified in aqueous solution using surfactants having an HLB somewhere between about 6 and 12. An oil in water emulsion is best formed with an emulsifier of HLB between about 12 and 16, while a water in oil emulsion is best formed with an emulsifier of HLB between about 3 and 7.0.

In addition to HLB, a second factor in choosing an emulsifier is the length of the hydrophobe chain. In general, longer fatty chains are generally more effective in penetrating fats and oils. The hydrophobe chain length should be between 12 and about 18 carbons, more preferably between about 16 and 18.

Where bacteria are more likely to be located on the outside of food surfaces, a wetting agent type of surfactant is preferred for the aqueous preservative system. There are a broad range of surfactants with reasonably good wetting properties, with an HLB, between about 6 and about 12.

If the surfactants are themselves preservatives, the HLB of the additive surfactant needs to be adjusted to bring the HLB of the complete antimicrobial system into the preferred HLB range for the application.

Specific embodiments of claims disclose a method to penetrate the fat coating on kibble to reach *Salmonella* that is not adequately killed in the manufacturing process for kibble for up to 60 days.

Even more specifically this invention also discloses that the compositions of the instant invention can also penetrate fat and kill or inhibit pathogens in other types of fatty foods, such as, ground beef or ground poultry, for example.

In yet another embodiment, some compositions of the instant invention prove to have inhibitor activity on *Salmonella* in chicken fat using an emulsifier with no reported antimicrobial activity, such as lecithin.

In yet another embodiment, some compositions of the instant invention, such as LAE-thymol, have inhibitory activity on *Salmonella* without an emulsifier or separate surfactant.

Description of Ingredients

Numerous GRAS (generally regarded as safe or generally recognized as safe) emulsifiers were examined as potential surfactants, penetrators, and/or solubilizers of chicken fat which is commonly used in the pet for industry to coat kibble, and chicken fat is where pathogen contamination in the manufacture of pet food/kibble has occurred. The instant invention has considered and evaluated sugar monoesters, glycerol monoesters, and lecithin as potential means of allowing preservatives, or other ingredients that have inhibitory characteristics to penetrate the chicken fat and kill pathogens.

It was determined to utilize only GRAS approved ingredients and to minimize the number of processing steps, so that any new innovations would not be prohibited due to government regulations or due to increasing the processing costs associated with what the industry is presently doing.

The first item was to find GRAS approved substances for human and pet/kibble feed that had a preserving ability to inhibit *Salmonella* dosed into chicken fat up to 60 days under normal storage conditions.

The compositions described herein can be referred to a preservatives, antimicrobials, penetrating, emulsifiers, surfactants, co-surfactants, or compositions. Each of the compositions, when added to chicken fat provides the effect, when coated on a pet food or human food, of preventing growth of *Salmonella* sp over an extended period of time, for example 60 days. This effect may be termed alternatively, preservation or anti-microbial activity.

The compositions described herein are effective at reducing by about 99% the amount of *Salmonella* sp. present on kibble or raw meats when compared to kibble treated with a composition lacking a lecithin; a glycerol monoester of a fatty acid; a sugar monoester of a fatty acid; or a $N^{\alpha}$—($C_8$-$C_{18}$) acyl arginine alkyl ($C_1$-$C_8$) ester salt for an extended period of time. The Examples and methods described herein refer to standards used in the industry for testing of food contamination. For example, pet food kibble is typically tested for a time period of between 0 and 60 days, and in particular 30 and 60 days. Human food testing varies, but can be anywhere from 1 day to 28 days depending upon the protocol. The extended period of time of the instant invention is a period of time greater than one day up to a period of time specified by any available testing protocol. The extended period of time may include 1 day, 3 days, 7 days, 28 days, 30 days, 60 days, or 120 days, or any day in between 1 day and 120 days, for example, 3 days, 30 days, or 60 days.

Antimicrobial Salts

The antimicrobial or preservative agent chosen needs to be effective against a broad range of bacteria such as *Salmonella, Listeria, E. coli, S. aureus, Clostridium, Campylobacter*, and other pathogens found in food. The agents optionally incorporated into this invention include any food-safe, antimicrobial or preservative agent that is effective at controlling the target pathogens. Preferred preservatives include the salts of lauroyl or cocoyl ethyl ester of arginine (LAE or CAE). Preferred salts of LAE and CAE include those that are water-soluble like the hydrochloride, acetate, lactate, as well as those that can provide controlled release properties due to their limited aqueous solubility, such as thymol, octanoate, decanoate, laurate, cocoate, myristate, palmitate and stearate or other fatty acid salts. The preferred release salts with limited solubility can also help penetration into fats and oils and can prevent loss of activity over time. Other suitable preservatives include alcohol fatty esters such as glycerol monooctanoate, glycerol monodecanoate, glycerol monomyristate and glycerol monopalmitate.

In the presence of fat, combining low water soluble salts with controlled release properties of LAE or CAE with emulsifying agents and/or suitable hydrophobic surfactants disclosed in the instant invention helps to spread into the fat and reach bacteria deep within the fat. These surfactants are less likely to help emulsify potassium benzoate or sorbate within the fat because of the water solubility and hydrophilic nature of these preservatives. The ingredients in the instant invention are themselves surfactants and together with the right surfactant system will readily spread with the target fats.

Furthermore, other conventional preservatives can be used including in addition to the compositions described herein and include, but are not limited to, ascorbic acid, acetic acid, benzoic acid, citric acid, erythorbic acid, lactic acid, sorbic acid, tartaric acid, propionic acid, and their sodium, potassium, ammonium and calcium salts. Additionally, effective preservation can be achieved using soluble nitrite, nitrate, sulfite, bisulfite, metabisulfite, dithionite, and biacetate salts. Additionally methyl, ethyl and propyl and butyl-p-hydroxy benzoate, methyl, ethyl, propyl and butyl paraben can be used as preservatives.

Lecithin

Lecithin (from the Greek lekithos, "egg yolk") is a generic term to designate any group of yellow-brownish fatty substances occurring in animal and plant tissues, which are amphiphilic—they attract both water and fatty substances (and so are both hydrophilic and lipophilic), and are used for smoothing food textures, dissolving powders (emulsifying), homogenizing liquid mixtures, and repelling sticking materials. Lecithins are mixtures of glycerophospholipids including phosphatidylcholine, phosphatidylethanolamine, phosphatidylinositol, and phosphatidic acid.

Lecithin has emulsification and lubricant properties, and is a surfactant. It can be totally metabolized (see Inositol) by humans, so is well tolerated by humans and nontoxic when ingested; some other emulsifiers can only be excreted via the kidneys.

According to ADM (ADM refers to Archer Daniels Midland), the major components of commercial soybean-derived lecithin are: 33-35% Soybean oil; 20-21% Inositol phosphatides; 19-21% Phosphatidylcholine; 8-20% Phosphatidylethanolamine; 5-11% Other phosphatides; 5% Free carbohydrates; 2-5% Sterols; 1% Moisture.

Lecithin is used for applications in human food, animal feed, pharmaceuticals, paints, and other industrial applications. In animal feed, it enriches fat and protein and improves palletization. The nontoxicity of lecithin leads to its use with food, as an additive or in food preparation. It is used commercially in foods requiring a natural emulsifier or lubricant. Lecithin is approved by the United States Food and Drug Administration for human consumption with the status "generally recognized as safe" or "GRAS". Lecithin is admitted by the EU as a food additive, designated as E322. As an emulsifier, soy lecithin is used in food applications as an aerating agent, viscosity modifier, dispersant and lubricant.

Typically, an emulsion is a suspension of small droplets of one liquid in another liquid with which it is incapable of mixing. Oil-in-water (O/W) and water-in-oil (W/O) are the two primary types of emulsions. Lecithin's molecular structure makes it an effective emulsifier for the interaction of water and oil. Phospholipids, the major component of lecithin, are partly hydrophilic (attracted to water) and partly hydrophobic (repelled from water). It is lecithin's ability to simultaneously interact with both oil and water that makes it such an effective and stable emulsifier. When introduced into a system, an emulsifier such as lecithin acts to help maintain a stable emulsion between two unmixable liquids. The emulsifier decreases the surface tension between the two liquids and allows them to mix and form a stable, heterogeneous dispersion.

Hydrophilic-Lipophilic Balance or "HLB" is an index of the predicted preference of an emulsifier for oil or water— the higher the HLB, the more hydrophilic the molecule; the lower the HLB, the more hydrophobic the molecule. According to ADM, typical usage levels of lecithin in an emulsion system are: 1-5% of the fat for W/O; 5-10% of the fat for O/W. The amount of lecithin used is dependent upon factors such as the pH, the inclusion of proteins, and the salt concentration.

Sugar Esters

Sugar esters have a wide variety of applications. Mixtures of regioisomers, as well as mono-, di- and tri-esters are used as emulsifiers, whose resulting physicochemical properties depend on the average degree of substitution and fatty acid chain length. They are used as non-ionic surfactants, bleaching boosters and food additives. Sucrose esters of fatty acids with a low degree of substitution can be used as food and cosmetic emulsifiers.

Particular examples of suitable surfactants for use in the provided compositions include as non-ionic surfactants sugar derived surfactants, particularly fatty acid esters of sugars and sugar derivatives. For examples, sugar fatty acid esters include fatty acid esters of sucrose, glucose, maltose and other sugars, esterified to fatty acids of varying lengths (e.g., varying numbers of carbons). The fatty acids typically have carbon chains between 8 and 28 carbons in length, and typically between 8 and 20, or between 8 and 18 or between 12 and 18, such as, but not limited to, stearic acid (18 carbons), oleic acid (18:1 carbons), palmitic acid (16 carbons), myristic acid (14 carbons) and lauric acid (12 carbons). Typically, the sugar ester surfactants are sucrose ester surfactants, typically sucrose fatty acid ester surfactants. A preferred sugar fatty acid ester is sugar C8-C18 fatty acid ester.

Sucrose Fatty Acid Ester Surfactants

Sucrose fatty acid ester surfactants contain one or more sucrose fatty acid esters, which are non-ionic surfactants that contain sucrose in the hydrophilic portions and fatty acids in the hydrophobic portions. The sucrose fatty acid esters can be made by well-known methods (see, for example, U.S. Pat. Nos. 3,480,616; 3,644,333; 3,714,144; 4,710,567; 4,898,935; 4,996,309; 4,995,911; 5,011,922; and 5,017,697 and International Patent Application Publication No. WO 2007/082149), typically in an esterification reaction as described below.

Because sucrose contains eight hydroxy (OH) groups, the esterification reaction can join the sucrose molecule to one fatty acid molecule, or can join it to a plurality of fatty acid molecules, producing different degrees of esterification, e.g., mono-, di-, tri- and poly- (up to octa-) fatty acid esters, but primarily mono-, di-, and/or tri-esters. The relative amounts of mono- di- tri- and/or poly-esters can depend on reaction conditions.

The fatty acid in the sucrose fatty acid ester can be any fatty acid, and can contain between 4 and 28 carbon atoms, typically between 8 and 28 carbon atoms, and typically between 8 and 25 carbon atoms, such as between 8 and 18 carbon atoms. The fatty acid can be synthetic or naturally occurring, and include linear or branched fatty acids. The fatty acids include, but are not limited to, lauric acid, myristic acid, palmitic acid, stearic acid, oleic acid, caproic acid, capric acid, decanoic acid and pelargonic acid. The more preferred sugar ester of this invention is sucrose monolaurate ("SL"). The sugar fatty acid esters used in the data generation for this invention were supplied by Mitsubishi Kagaku Foods Corporation. The SL used was Ryoto Sugar Ester L-1695 at 80% monoester. For purposes of this disclosure, "SL types" refers to sucrose fatty acid ester surfactants.

To optimize the overall desired properties, the monoester of sucrose should be greater than or equal to 70 wt % of total ester content, the higher the better Monolaurin (U.S. Pat. No. 8,193,244B1 and U.S. Pat. No. 9,023,891 B2) disclose the use of monoglycerides consisting of those esters formed from saturated fatty acids having from 6 to 14 carbon atoms for their spermicidal, antimicrobial and cytocidal activity in uses such as food preservatives, medical, personal care and hygiene, cosmetics, medical, and related applications. The object of these previous inventions is the provision of an enhanced combination of $N^\alpha$—(C8 to C16) alkanoyl dibasic amino acid (C1 to C12) alkyl ester salts and (C8-C16) fatty acid monoglycerol esters as the basis for antimicrobial compositions and preservatives. Specifically, the preferred monoester in the inventors' previous patents is glycerol monolaurate (Monolaurin or "ML"). U.S. Pat. No. 8,193,244B1 and U.S. Pat. No. 9,023,891 B2 are included in this application in their entirety.

There are two factors to consider when choosing the glycerol monoester of a fatty acid. The ester part could be from $C_8$-$C_{18}$ saturated hydrocarbon, however the $C_{12}$ has been consistently shown to be the optimal choice, since when esterifying glycerin it is possible to obtain di- and tri-esters as well as the monoester. Therefore, in order to achieve the best antibacterial effect, the monoester of monolaurin should be greater or equal to 70 wt % of the total ester content the higher being the better.

Therefore the two GRAS approved food additives that were evaluated in the instant invention, 1) glycerol mono-fatty acid. esters ($C_8$-$C_{18}$), e.g. monolaurin ("ML"), and 2) sucrose mono-fatty esters ($C_8$-$C_{18}$), e.g. sucrose laurate ("SL"), sucrose myristate, sucrose palmitate, or sucrose stearate, are well described in the literature.

The amount of glycerol mono-fatty acid esters ($C_8$-$C_{18}$) can range from about 0.01 to about 7.5 wt % added to the kibble. The preferred amount of glycerol mono-fatty acid. esters ($C_8$-$C_{18}$) can range from about 0.02 to about 5.0 wt % added to the kibble. The most preferred amount of glycerol mono-fatty acid esters ($C_8$-$C_{18}$) can range from 0.04 to about 2.5 wt % added to the kibble. The most preferred of the $C_8$-$C_{18}$ monoesters of glycerol is monolaurin ("ML"). The amount of the $C_8$-$C_{18}$ monoesters of sucrose can be from about 0.02 to about 15.0 wt % added to the kibble. The preferred amount of the $C_8$-$C_{18}$ monoesters of sucrose can be from about 0.04 to about 10 wt % added to the kibble. The most preferred amount of the $C_8$-$C_{18}$ monoesters of sucrose can be from about 0.08 to about 7.5 wt % added to the kibble. The most preferred of the $C_8$-$C_{18}$ monoesters of sucrose is sucrose laurate. The amount of lecithin can range from about 0.05 to about 30.0 wt %, added to the kibble. The preferred amount of lecithin can range from about 0.1 to about 20.0 wt % added to the kibble. The most preferred amount of lecithin can range from about 0.15 to about 15.0 wt %, added to the kibble.

The amount of the $N^\alpha$—($C_8$-$C_{18}$) acyl arginine alkyl ($C_1$-$C_8$) ester can range from about 0.002 to about 4.0 wt % added to the kibble.

The preferred amount of the $N^\alpha$—($C_8$-$C_{18}$) acyl arginine alkyl ($C_1$-$C_8$) ester can range from about 0.004 to about 3.0 wt % added to the kibble. The most preferred amount of the $N^\alpha$—($C_8$-$C_{18}$) acyl arginine alkyl ($C_1$-$C_8$) ester can range from about 0.008 to about 2 wt % added to the kibble.

The amount of glycerol mono-fatty acid. esters ($C_8$-$C_{18}$) can range from about 0.02 to about 9 wt % added to the ground beef or poultry. The preferred amount of glycerol mono-fatty acid esters ($C_8$-$C_{18}$) can range from about 0.04 to about 6 wt % glycerol monoester, added to the ground beef or poultry. The most preferred amount of glycerol mono-fatty acid esters ($C_8$-$C_{18}$), can range from about 0.08 to about 5.0 wt % added to the ground beef or poultry. The amount of the $C_8$-$C_{18}$ monoesters of sucrose can be from about 0.02 to about 18.0 wt % added to the ground beef or poultry. The preferred amount of the $C_8$-$C_{18}$ monoesters of sucrose can range from about 0.04 to about 12 wt % added to the ground beef or poultry. The most preferred amount of the $C_8$-$C_{18}$ monoesters of sucrose can be from about 0.02 to about 7.5 wt % added to the ground beef or poultry. The most preferred of the $C_8$-$C_{18}$ monoesters of sucrose is sucrose laurate. The amount of lecithin can range from about 0.05 to about 30.0 wt %, added to the added to the ground beef or poultry. The preferred amount of lecithin can range from about 0.1 to about 25.0 wt %, added to the ground beef or poultry. The most preferred amount of lecithin can range from about 0.25 to about 20 wt %, added to the ground beef or poultry. The amount of the $N^\alpha$—($C_8$-$C_{18}$) acyl arginine alkyl ($C_1$-$C_8$) ester can range from about 0.002 to about 4.0 wt % added to the ground beef or poultry. The preferred amount of the $N^\alpha$—($C_8$-$C_{18}$) acyl arginine alkyl ($C_1$-$C_8$) ester can range from about 0.004 to about 3.0 wt % added to the ground beef or poultry. The most preferred amount of the $N^\alpha$—($C_8$-$C_{18}$) acyl arginine alkyl ($C_1$-$C_8$) ester can range from about 0.008 to about 2 wt % added to the ground beef or poultry.

The most preferred $N^\alpha$—($C_8$-$C_{18}$) acyl arginine alkyl ($C_1$-$C_8$) ester is LAE-HCl. The most preferred low water soluble salt of $N^\alpha$—($C_8$-$C_{18}$) acyl arginine alkyl ($C_1$-$C_8$) ester is LAE-Thymol.

The amount of glycerol mono-fatty acid. esters ($C_8$-$C_{18}$), e.g. monolaurin ("ML"), can range from about 0.05 to about 10.0 wt. % added to the chicken fat, i.e. based on 100 g kibble, the level can range from 0.0005 to about 0.10 wt. % added to the kibble. The amount of the $C_8$-$C_{18}$ monoesters of sucrose can be from about 0.1 to about 20.0 wt % added to the chicken fat added to the chicken fat i.e. based on 100 g kibble, the level can range from 0.001 to about 0.20 wt. % added to the kibble.

As can be seen by the Examples, a method of making an improved pet food kibble comprising is fully described. Methods of making coated pet food kibble and the kibble itself are fully described. The method includes obtaining pet meal formed into a kibble shape and coating the kibble shaped pet meal with a composition. The composition may include any combination of chicken fat with one or more of: a lecithin; a glycerol monoester of a fatty acid; a sugar monoester of a fatty acid; and a $N^\alpha$—($C_8$-$C_{18}$) acyl arginine alkyl ($C_1$-$C_8$) ester salt with the proviso that the combinations each reduce by about 99% for an extended period of time the amount of Salmonella sp. present on kibble when compared to kibble treated with a composition lacking a lecithin; a glycerol monoester of a fatty acid; a sugar monoester of a fatty acid; or a $N^\alpha$—($C_8$-$C_{18}$) acyl arginine alkyl ($C_1$-$C_8$) ester salt. The composition may include at least one of: (i). from about 0.05 to about 30 wt % lecithin and from about 0.5 to about 99 wt % chicken fat; (ii). 0.05 to about 30 wt % lecithin, from about 0.01 to about 7.5 wt % glycerol monoester of a fatty acid, from about 0.02 to about 15.0 wt % sugar monoester of a fatty acid, and from about 0.5 to about 99.0 wt % chicken fat; (iii). 0.05 to about 30.0 wt % lecithin, from about 0.002 to about 4.0 wt % $N^\alpha$—($C_8$-$C_{18}$) acyl arginine alkyl ($C_1$-$C_8$) ester, and about 0.5 to about 99.0 wt % chicken fat; (iv). from about 0.002 to about 4.0 wt % of $N^\alpha$—($C_8$-$C_{18}$) acyl arginine alkyl ($C_1$-$C_8$) ester-thymol and 0.5 to about 99.0 wt % chicken fat. The composition used may also be a combination of any of (i), (ii), (iii), and (iv). When the pet food kibble coated with a composition as described above, with at least one of (i)-(iv), the kibble exhibits amounts of Salmonella sp. that are reduced by about 99%. This reduction is effective for at least 60 days post coating when compared to pet food kibble coated with a composition lacking one of (i)-(iv).

The method of obtaining pet meal formed into a kibble shape may include: adding moisture to a dry meal to obtain wet meal; extruding wet meal under pressure and cutting to preferred kibble size; drying kibble to a moisture level of about 6 to about 8 wt %; sifting to remove broken and fines, so as to result in a kibble-shaped pet meal.

The step of coating the kibble shaped pet meal may include at least one step of spraying the composition on the kibble or submersion of the kibble in the composition.

Each of compositions (i)-(iv) may further include buffers to maintain pH of less than 7 or a chelant, such as EDTA. Each of preservative compositions (i)-(iv) may further include a flavoring, coloring or enhancer.

In some cases, the glycerol monoester of composition ii is monolaurin and the sugar monoester of composition ii is sucrose laurate; or the $N^\alpha$—($C_8$-$C_{18}$) acyl arginine alkyl ($C_1$-$C_8$) ester of composition (iii) is LAE-HCl.

Also disclosed are methods of treating raw beef or poultry prior to grinding with a composition. The compositions may be one or more of: i: from about 0.05 to about 30.0 wt % lecithin; ii. about 0.05 to about 30.0 wt % lecithin, about 0.02 to about 9.0 wt % glycerol monoester, and from about 0.02 to about 18.0 wt % sugar monoester of a fatty acid; iii. from about 0.05 to about 30.0 wt % lecithin and from about 0.002 to about 4 wt % $N^\alpha$—($C_8$-$C_{18}$) acyl arginine alkyl ($C_1$-$C_8$) ester; and iv. from about 0.002 to about 4.0 wt % LAE-thymol, and any combination of (i), (ii), (iii), and (iv), all weights based on the total weight of the beef or poultry parts being ground. In use, the beef or poultry is coated with a composition having at least one of the compositions (i)-(iv) prior to grinding the beef or poultry. The ground beef or poultry exhibits amounts of Salmonella sp. present in the ground beef or poultry reduced by about 99% for at least 3 days post coating when compared to raw beef or poultry coated with a composition lacking one of (i)-(iv).

Each of compositions (i)-(iv) used to treat raw beef or poultry may further include buffers to maintain pH of less than 7 or a chelant, such as EDTA. In some cases, the glycerol monoester of composition (ii) is monolaurin and the sugar monoester of composition (ii) is sucrose laurate; or the $N^\alpha$—($C_8$-$C_{18}$) acyl arginine alkyl ($C_1$-$C_8$) ester of composition (iii) is LAE-HCl.

Examples

The following examples are set forth to assist in understanding the invention and should not, of course, be construed as specifically limiting the invention described and claimed herein. Such variations of the invention, including the substitution of all equivalents now known or later developed, which would be within the purview of those skilled in the art, and changes in formulation or minor changes in experimental design, are to be considered to fall within the scope of the invention incorporated herein.

The following abbreviations may be found throughout the Examples. "LAE HCL" refers to $N^\alpha$ $C_8$-$C_{16}$ alkanoyl-L di-basic amino acid —$C_1$-$C_4$ alkyl ester being $N^\alpha$- lauroyl-L-arginine-ethyl ester HCL salt. "ML" refers to monolaurin. "SL" refers to sucrose laurate. "DW" refers to distilled water. "CF" refers to chicken fat. ADM refers to Archer Daniels Midland. "Emulsifier" can be used interchangeably with "lecithin" or any of the tradenames: Ultralec® F, Performix™ E, or Yelkin™1018. RT refers to room temperature.

Sample Preparation

Control consisting of 50 g of distilled water (DW) while vigorously stirring and 50 g of chicken fat ("CF"; for example as sold by AFB International, 3 Research Park Drive, St. Charles, Mo. 63304).

Sample #1 was prepared by making an emulsion consisting of adding 7 g of ADM Ultralec® F lecithin to 50 g of distilled water (DW), and then adding 50 g of chicken fat ("CF") while vigorously stirring. Total 50 g CF+50 g DW+7 g emulsifier=107 g. This emulsion was clear after seven days at RT.

Sample #2 was prepared by making an emulsion consisting of adding 7 g of ADM Performix™ E lecithin and 1.0 g of sucrose laurate ("SL") to 50 g of distilled water (DW) while vigorously stirring, then 50 g of chicken fat ("CF") was added to the mix with continued stirring, then 0.5 g of monolaurin ("ML") was added to the emulsion with continued stirring. For the sake of this invention, both ML and SL are defined as "actives". It can be appreciated that SL and ML are both surfactants with inhibitory characteristics. ML is known to need solubilization in an aqueous system, so it was added as a powder after the CF was added to aid in its solubilization. This emulsion was clear after seven days at RT. In the instant invention, SL acts as a solubilizer to the ML. Total "actives" in sample #2 are 1.5 g. Sample #2 consists of 50 g CF+50 g DW+7 g ADM Performix™ E emulsifier+1.5 gm actives=108.5 g; 1.5 g actives/108.5 g=0.014 or 1.4 wt % actives; 10 g emulsion coated onto 100 g kibble=>10 g×1.4 wt %/100 g kibble=0.14 g total actives/100 g kibble or 1400 ppm of actives.

Sample #3 was prepared by making an emulsion consisting of 7 g of ADM Performix™ E lecithin, 50 g of distilled water (DW), 50 g of chicken fat ("CF"), and 0.1 g of LAE-HCl preservative. The LAE-HCl was dissolved into the DW, and separately the lecithin was added to the chicken fat, then both were added together by vigorous mixing. Total 50 g CF+50 g DW+7 g emulsifier+0.1 g LAE-HCl=107.1 g. 0.1 g active preservative/107.1 g=0.00093 or 0.093 wt % preservative; 10 g emulsion coated onto 100 g kibble=>10 g×0.093 wt % LAE-HCl preservative/100 g kibble=0.093 g total preservative/100 g kibble or 93 ppm. This emulsion was clear after seven days at RT.

Sample #4 was by making an emulsion consisting of 7 g of ADM Yelkin™018 lecithin added to 50 g of chicken fat ("CF") by vigorous mixing, then 50 g of distilled water (DW) was added with continued stirring. No additional surfactants or preservatives were added.

Sample #5 was prepared w/o lecithin by dissolving LAE-thymol into 50 g of DW with vigorous mixing, and then the DW+LAE-thymol was added to 50 g of chicken fat with vigorous mixing. LAE-thymol is a controlled release salt of LAE with low water solubility as compared to LAE-HCl. Total 0.1 g preservative+50 g CF+50 g DW=100.1 g; 0.1 g active preservative/100.1 g total=–0.1 wt % actives; 10 g CF/DW coated onto 100 g kibble=>10 g×0.1 wt % preservative/100 g kibble=>0.01 g total preservative/100 g kibble or 100 ppm.

All samples using CF/DW/emulsifier systems were visually stable after storage at RT for one week.

Table 1 summarizes the compositions tested. Each sample contained 50 g chicken fat and 50 g DW; 10 g of each sample was applied to 10 g kibble. Testing and storage was at RT. Samples of coated kibble were kept in sealed plastic bags after applying to the kibble.

TABLE 1

Summary of compositions formulation according to the instant invention

| Sample | Lecithin Emulsifier | Emulsifier, g | Chicken fat, g | DW, g | Monolaurin (ML) | Sucrose laurate (SL), g | LAE-HCl, g | LAE-thymol, g |
|---|---|---|---|---|---|---|---|---|
| Control | — | — | 50 | 50 | | | | |
| #1 | Ultralec ™ | 7 | 50 | 50 | | | | |
| #2 | Performix ™ E | 7 | 50 | 50 | 0.5 | 1 | | |
| #3 | Performix ™ E | 7 | 50 | 50 | | | 0.1 | |
| #4 | Yelkin ™ 1018 | 7 | 50 | 50 | | | | |
| #5 | — | — | 50 | 50 | | | | 0.1 |

Experimental Methods 10 g of each sample and control was applied to 100 g kibble. To apply each sample to the kibble, all samples were separately shaken onto a commercial kibble using a common hand held "cocktail" shaker. If a sample was made with a surfactant/emulsifier, to check the condition of the emulsions, each sample was stored in a glass bottle. In a commercial setting this step can be done either with a revolving pan or with a spray nozzle. There is no anticipated extra step in the overall process as compared with the steps commonly used in the pet food industry to manufacture kibble. Also the inclusion of the lecithin emulsifier only increases the overall water content by 4 to 8% and it does not necessitate an extra step to remove this water.

Testing and storage was at RT. Samples of coated kibble were kept in sealed plastic bags after applying to the kibble. A sample was removed at 30 days for testing and a sample was removed at 60 days for testing. The kibble samples were challenged with a known load and reduction of bacteria measured.

Performance kill tests on kibble against a mix of *Salmonella* bacterial strains (ATCC 10708, 6539, and 14028), defined in the instant invention as *Salmonella* sp., were conducted at 30 and 60 days. At each time point, cfu (colony forming units) were observed. The cfu was converted to a log number and the log reduction in colony forming units observed. This calculation is also shown as a percentage.

Results

TABLE 2 colony forming units of *Salmonella* sp. found on coated kibble after 30 days

| Sample | cfu recovered | Log | Log reduction | % reduction |
|---|---|---|---|---|
| Control | $1.8 \times 10^4$ | 4.25 | 0 | 0 |
| #1 | $8.5 \times 10^2$ | 2.9 | 1.35 | 92.0 |
| #2 | $1.0 \times 10^2$ | 2.0 | 2.25 | 99.4 |
| #3 | $2.8 \times 10^2$ | 2.45 | 1.80 | 97.0 |
| #4 | $4.0 \times 10^2$ | 2.55 | 1.70 | 96.0 |
|  | $6.0 \times 10^2$ | 2.75 | 1.50 | 94.0 |

Table 3 demonstrates the log reduction found at 60 days post coating of kibble for all five samples.

TABLE 3 colony forming units of *Salmonella* sp. found on coated kibble after 30 days

| Sample | cfu recovered | Log | Log reduction | % reduction |
|---|---|---|---|---|
| Control | $1.8 \times 10^4$ | 4.25 | 0 | 0 |
| #1 | $2.3 \times 10^4$ | 4.45 | 0 | 0 |
| #2 | $1.0 \times 10^1$ | 1.05 | 3.4 | 99.95 |
| #3 | $3.1 \times 10^3$ | 3.55 | 0.9 | 89.00 |
| #4 | $2.0 \times 10^1$ | 1.35 | 3.1 | 99.92 |
| #5 | $1.6 \times 10^2$ | 2.25 | 2.2 | 99.35 |

Mono fatty acid glycerides, with C6-C18 carbon chain length of the fatty acid, in combination with mono fatty acid sucrose derivatives, from C6-C18 carbon chain length and suitable emulsifiers, provided the overall anti-microbial/preservative activity in pet food against *Salmonella* contained in chicken fat coated onto kibble. The log reduction was significant for several of the samples tested using various food preservatives (samples #2-5), with some compositions of the instant invention without containing lecithin giving significant log reductions (sample #5). Samples also containing only lecithin also gave significant log reductions (sample #4). It is very advantageous that all ingredients are GRAS approved for food, and they all have nutritional value as food additives. It is expected that there will be no apparent taste problems at the inventive usage levels.

Samples 1-5 showed log reductions after 30 days. Sample 1 showed no log reduction after 60 days, using only an emulsifier with an HLB of 7. (There was also visual growth noted after 60 days). Sample #4 using only an emulsifier with an HLB of 11 gave increased log reduction after 60 days. Sample #2 with an emulsifier with an HLB of 12 and two GRAS surfactants with inhibitory characteristics gave a increased log reduction after 60 days, while sample #3 with the same emulsifier as sample #2 but with a food preservative gave reduced log reduction after 60 days. Sample #5 with no emulsifier and no surfactants but with the salt LAE-thymol, gave an increased log reduction after 60 days. There was no mold evident in Sample #3 of coated kibble in a sealed plastic bag using a combination of sucrose laurate and monolaurin emulsified with lecithin after 120 days.

Another test using the composition in Sample #3 on poultry utilizing 0.093 wt % LAE-HCl (per weight of raw poultry). At 3 day recovery, the cfu $1.51 \times 10^5$, the log 5.18, the log reduction 2, for a % reduction of 99.95%. (The control: cfu at $2 \times 10^7$, log 7.3). For Sample #3 coated onto kibble, the log reduction was 1.9 after 30 days and 0.9 after 60 days. A zone of inhibition was done at 1 hour to confirm if these samples had any preservative activity. A zone of inhibition is used as a screening test to determine if further testing should be done for a quantitative, determination e.g. a time kill log reduction. The zone data supports the 3 day results that sample 3 is effective at killing *Salmonella* in chicken fat.

As stated above, while the present application has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details of the illustrative examples shown. Departures may be made from such details and examples without departing from the spirit or scope of the general inventive concept.

The invention claimed is:

1. A preservative composition comprising:
   a glycerol monoester of a fatty acid present in an amount of about 0.01 to about 7.5 percent by weight of the composition;
   a sugar monoester of a fatty acid present in an amount of about 0.02 to about 15.0 percent by weight of the composition;
   a lecithin having a HLB between 7 and 12 and being present in an amount of about 0.05 to about 30.0 percent by weight of the composition; and
   optionally, a chelating agent.

2. The composition of claim 1 wherein the glycerol monoester of a fatty acid is monolaurin.

3. The composition of claim 2, wherein the monoester content of the monolaurin comprises greater or equal to 70 percent by weight monoester.

4. The composition of claim 1, wherein the glycerol monoester of a fatty acid is present in an amount of about 0.04 to about 2.5 percent by weight of the composition.

5. The composition of claim 1, wherein the sugar monoester of a fatty acid is sucrose laurate.

6. The composition of claim 5, wherein monoester content of the sucrose laurate comprises greater or equal to 80 percent by weight monoester.

7. The composition of claim 1, wherein the sugar monoester of a fatty acid is present in an amount of about 0.08 to about 7.5 percent by weight of the composition.

8. The composition of claim 1, wherein the lecithin has a HLB of about 11 to about 12.

9. The composition of claim 1 wherein the lecithin is present in an amount between about 0.15 to about 15.0 percent by weight of the composition.

10. The composition of claim 1 wherein the chelating agent is EDTA.

11. The composition of claim 1, further comprising buffers to maintain pH of less than 7.

12. The composition of claim 1, further comprising a flavoring or coloring.

13. The composition of claim 1, further comprising a surfactant.

14. The composition of claim 1, wherein a glycerol monoester of a fatty acid and a sugar monoester of a fatty acid are present in a weight:weight ratio of about 1:2.

15. A food composition comprising a food stuff and an effective amount of a composition comprising:
- a glycerol monoester of a fatty acid present in an amount of about 0.01 to about 7.5 percent by weight of the composition;
- a sugar monoester of a fatty acid present in an amount of about 0.02 to about 15.0 percent by weight of the composition;
- a lecithin having a HLB between 7 and 12 and being present in an amount of about 0.05 to about 30.0 percent by weight of the composition; and
- optionally, a chelating agent.

16. The food composition of claim 15, wherein the food stuff is selected from the group consisting of: raw poultry, raw beef, and a pet food kibble.

17. A method of preserving a food in need of preservation or improved shelf-life comprising the step of adding to the food a safe and effective amount of the composition of claim 1, wherein the food treated with the composition exhibits amounts of *Salmonella* sp. reduced by about 99% for at least 60 days after composition is added to food product.

\* \* \* \* \*